US008656451B2

(12) United States Patent
Hu et al.

(10) Patent No.: US 8,656,451 B2
(45) Date of Patent: Feb. 18, 2014

(54) POLICY APPLICATION SERVER FOR MOBILE DATA NETWORKS

(75) Inventors: Q James Hu, Sammamish, WA (US); Douglas Eng, Sammamish, WA (US); Terry Figurelle, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1021 days.

(21) Appl. No.: 12/116,538

(22) Filed: May 7, 2008

(65) Prior Publication Data

US 2009/0228953 A1    Sep. 10, 2009

Related U.S. Application Data

(60) Provisional application No. 61/034,887, filed on Mar. 7, 2008.

(51) Int. Cl.
H04L 29/06    (2006.01)

(52) U.S. Cl.
USPC .................. 726/1; 709/224; 709/238

(58) Field of Classification Search
USPC .......................... 726/1, 8; 713/156
See application file for complete search history.

(56) References Cited

U.S. PATENT DOCUMENTS

| | | | |
|---|---|---|---|
| 6,910,074 B1 | 6/2005 | Amin et al. | |
| 6,952,728 B1 * | 10/2005 | Alles et al. | 709/224 |
| 7,302,493 B1 * | 11/2007 | Alles et al. | 709/238 |
| 7,916,726 B2 * | 3/2011 | Rasanen | 370/392 |
| 2002/0036983 A1 | 3/2002 | Widegren et al. | |
| 2002/0062379 A1 | 5/2002 | Widegren et al. | |
| 2006/0251069 A1 * | 11/2006 | Cathey et al. | 370/389 |
| 2007/0174905 A1 * | 7/2007 | Martherus et al. | 726/8 |
| 2008/0209505 A1 * | 8/2008 | Ghai et al. | 726/1 |
| 2008/0228785 A1 * | 9/2008 | Kavuri et al. | 707/100 |
| 2008/0256593 A1 * | 10/2008 | Vinberg et al. | 726/1 |

OTHER PUBLICATIONS

Niemi, "SIP Event Notification Extension for Notification Rate Control", 2012, Ericsson, p. 1-25.*
International Search Report and Written Opinion of the International Searching Authority, mailed Jun. 8, 2009, in PCT/US2009/036060; AT&T Mobility II, LLC, Applicant; 12 pages.
International Preliminary Report on Patentability and Written Opinion of the International Searching Authority, mailed Sep. 26, 2010, in PCT/US/2009/036060; AT&T Mobility II, LLC, Applicant; 10 pages.

* cited by examiner

*Primary Examiner* — Morshed Mehedi
*Assistant Examiner* — Gregory Lane

(57) ABSTRACT

A policy application server and methods for use are described. The policy application server is a logical element of a policy-based control and charging system for a mobile data service network. The policy application server is configured to manage policies including creating, revising, formatting, and provisioning of policies. The policy application server is configured to assemble policy rules from policies and context data. Context data includes subscriber and service information needed to make a particular policy rule. The policy application server gathers context data from one or more network databases. The policy application server is configured to send policy rules to select ones of a plurality of policy decision engines. The policy application server manages the storing of policies, policy rules and formatted context data in select ones of a plurality of policy repositories.

26 Claims, 3 Drawing Sheets

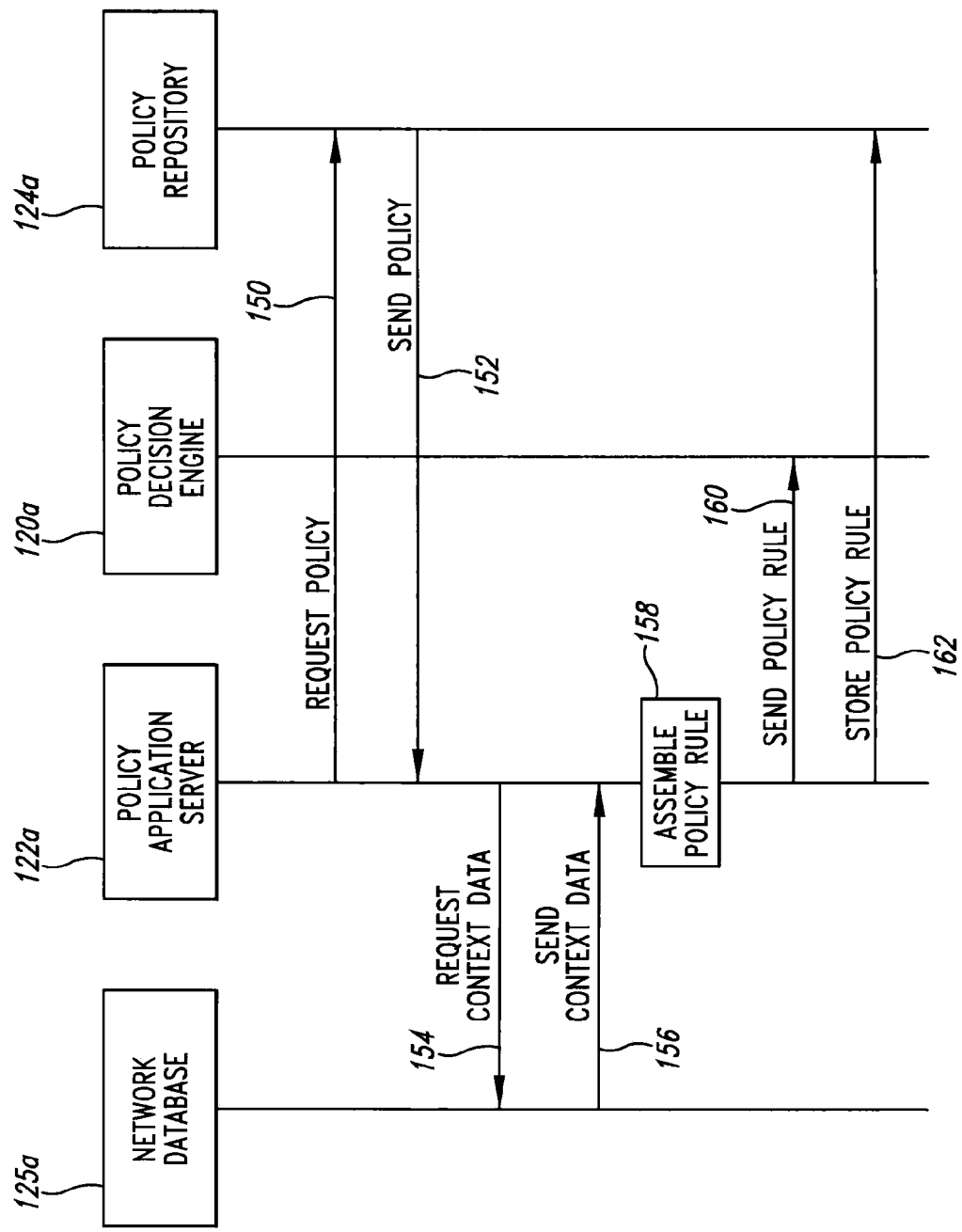

POLICY APPLICATION SERVER FOR MOBILE DATA NETWORKS

BACKGROUND OF THE INVENTION

1. Field of the Invention

The present invention is directed generally to the control of data networks serving mobile wireless users. In particular, the present invention is directed to systems for policy management in a data network that uses policies to control and charge for mobile data services.

2. Description of the Related Art

Operators of mobile wireless networks have in recent years added data networks to their core networks to allow them to offer data services to their mobile subscribers. However, network operators did not develop unified systems for controlling subscriber access and did not develop a unified way to charge for data services. For example, a network operator may have deployed one control and charging system at a network gateway for general access to data network services and then deployed control and charging systems for each individual service offered. However, this approach has become increasingly burdensome as network operators want to deploy ever more services.

New services could be deployed faster and with less expense if each new service did not require a new controlling and charging system. To meet this need, standards bodies have proposed unified policy and charging control architectures. One example of this effort is the 3GPP R7 Policy Control and Charging Architecture. (See Technical Specification 23.203 V8.0.0 (2007-12), which is incorporated by reference in its entirety). This architecture allows customized control and charging policies to be made and enforced for unique combinations of subscribers and services. Each subscriber may have a unique assortment services that they are allowed to use, at rates unique to the subscriber. Each service may have unique requirements for network resources in order to properly provide the service.

In the 3GPP architecture, control and charging enforcement is performed in a gateway between the carrier's data access network and service providing networks. The gateway has a policy enforcement engine called a Policy Control and Charging Enforcement Function (PCEF) in 3GPP. The PCEF examines packets passing through the gateway and enforces control and charging policy decisions on the packets. These policy decisions are made by a policy decision engine called a Policy Control and Charging Rules Function (PCRF) in 3GPP. The 3GPP does not specify any logical element to perform policy management functions such as creating or locating policies. Having the policy decision engine perform policy management functions would not give consistent results since there would likely be more than one policy decision engine in a network. This could cause conflict and coordination problems. Different policy decision engines could potentially make different policies for the same subscriber using the same service when the subscriber's user device moves from one access network to another, even when both access networks are part of the same overall network, operated by the same business entity. Also, having the policy decision engine perform policy management tasks may overtax the policy decision engines and interfere with the other tasks of the policy decision engines, such as the task of making policy decisions and communicating with policy enforcement engines and application servers about changes to the access network or the service that may require new or modified policy decisions. Additionally, it can be inefficient to have each policy decision engine manage its own set of policies since the same policy may be used by different policy decision engines. Therefore, it can be appreciated that there is a significant need for a new policy management architecture. The present invention provides this and other advantages as will be apparent from the following detailed description and accompanying figures.

BRIEF DESCRIPTION OF THE SEVERAL VIEWS OF THE DRAWING(S)

FIG. 3 shows a call flow diagram of a policy application server assembling formatted context data for a policy decision.

DETAILED DESCRIPTION OF THE INVENTION

Described herein are several embodiments of a new policy control and charging architecture. This new architecture introduces new logical elements to perform policy management and storage functions. These new logical elements can make the policy control and charging architecture more efficient and consistent by freeing policy decision engines from this task and prevent duplication of effort or conflict in deployments with more than policy decision engine. Some embodiments of this new architecture can be considered extensions of the 3GPP architecture, in the sense that the invention does not contradict the 3GPP standard. However, the invention does not depend on the 3GPP standard and other embodiments of this new architecture apply the principles of this invention in an architecture that is not fully compliant with 3GPP.

In the Figures, various objects are identified with reference numbers. If there are multiple copies of the same object in a figure, they will be referred to by the same reference number but with a different suffix letter appended. In the following discussion, if a reference is made to a reference number that identifies multiple objects but without a suffix letter appended, then the reference is to all the multiple objects as a group.

Figure 1:
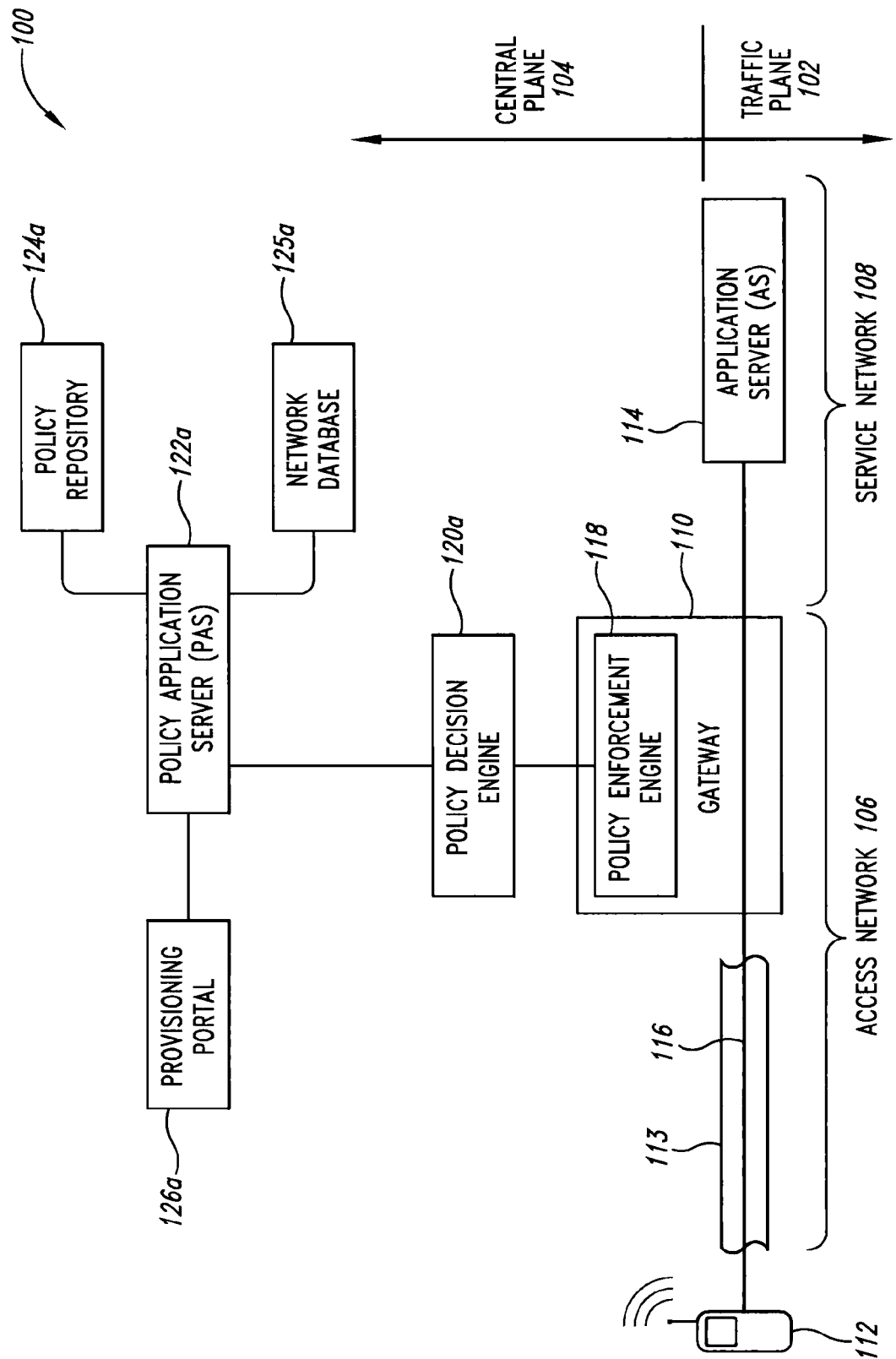
FIG. 1 shows a mobile data network with a policy and charging control architecture that includes a policy application server.

FIG. 1 shows an example embodiment of a mobile data network 100 with a policy and charging control architecture. This mobile data network 100 is divided into a traffic plane 102 and the control plane 104. The traffic plane 102 is divided into an access network 106 and a service providing network 108. A gateway 110 is part of the access network 106, and demarks a boundary with the service providing network 108. The access network 106 is configured to set up an access network bearer 113 between a user device 112 registered on a mobile network to a subscriber and the gateway 110. The access network bearer 113 is a data packet transmission path of defined capacity, delay and bit error rate. The user device 112 may then send and receive data packets through the access network bearer 113 provided by the access network 106 to an application server 114 to deliver a service provided by the service network 108. These data packets carried between the user device 112 and the application server 114 define one or more service data flows 116 for a particular service. A service may have more than one service data flow 116 and the access network bearer 113 may carry multiple services simultaneously. The number of service data flows 116 that a particular service can carry is determined by the capacity of the access network bearer and its ability to meet the Quality of Service (QoS) requirements of multiple services.

The control plane 104 includes a policy enforcement engine 118, a policy decision engine 120a, a policy application server 122a, a policy repository 124a, a network database 125a and a provisioning portal 126a. The policy enforcement engine 118 is a logical element located in the gateway 110 that applies policy decisions to service data flows 116 passing through the gateway 110. Policy decisions are based on policies established by an operator of the network 100.

The term "policy," as used herein, is a set of instructions for handling service data flows 116 carrying a session of a service provided to a subscriber by the network 100. The handling instructions may include controlling instructions, charging instructions or both. The policy may be very generic and be applicable many different types of services and subscribers. Alternatively, the policy may be specific to a category of services or to a specific service while applicable for many different subscribers. In yet another alternative, the policy may be specific to a category of subscribers or to a specific subscriber while applicable for many different services. In still yet another alternative, the policy may be specific to a subscriber and specific to a service, but not to a session of the specific service.

While the policy may be broadly generic or directed to specific types of services or subscribers, is generally missing at least some information needed for handling for a specific subscriber or a specific service or a specific session of the specific service. This missing information is referred to herein as "context data." Context data includes information that can be used to generate one or more service data flow filters, which can be used to identify one or more service data flows 116 carrying a session of a specific service for a specific subscriber. This service data flow identifying information usually includes the Internet Protocol (IP) addresses and ports of the application server 114 providing the specific service session and the user device 112 participating in that service session. Context data may also include specific instruction parameters, such as a unit price to which the subscriber has agreed for the specific service. Context data may include QoS requirements for the specific service session. Context data may include a list of services that a specific subscriber is allowed to access. The context data used to make a particular policy into an enforceable policy rule may be stored in several different databases and may need to be re-formatted into a form used to make policy rules.

As will be described in greater detail below, the policy and the context data are combined to generate a "policy rule," which includes sufficient information to permit decisions to be made regarding one or more service data flows carrying a specific service session for a specific subscriber from the network 100. A policy decision comprises a set of policy rules bound to information identifying a particular access network bearer 113.

The policy enforcement engine 118 enforces the policy decision by examining packets in the access network bearer 113 identified by the policy decision to detect service data flows 116 that match one of the filters. The policy enforcement engine 118 applies the instructions in the policy decision to matching service data flows 116. For example, a remote presentation service could have two service data flows 116, one carrying an audio stream and the other carrying a series of images such as may be used as slides in a presentation. The policy enforcement engine 118 is loaded with a policy decision regarding the remote presentation service that has information identifying an access network bearer 113 carrying the service and two policy rules, one for the audio stream and the other for the series of images. Each policy rule has a service data flow filter. The policy enforcement engine 118 examines the packets in the identified access network bearer 113 by applying the two service data flow filters to the packets to detect packets belonging to the two service data flows in question. A packet that the policy enforcement engine 118 identifies as belonging to a service data flow carrying the audio stream will have the policy rule for the audio stream applied to it. This policy rule may have charging instructions directing, for example, an on-line charging system charge $0.0001 per bit in the packet to the account of the subscriber. The policy rule may have control instructions directing, for example, that the QoS class identifier in the packet header be set to class 5.

The policy decision engine 120a is configured to load the policy enforcement engine 118 with policy decisions needed to control and charge for service data flows 116 currently passing through the gateway 110. The policy decision engine 120a is also configured to create a policy decision for a particular service by binding an appropriate set of policy rules for a particular service to information identifying an access network bearer 113. The policy decision engine 120a is logically linked to the policy enforcement engine 118 and is configured to receive information about the access network bearer 113 from the policy enforcement engine 118, including information identifying the access network bearer. The policy decision engine 120a is logically linked to the policy application server 122a and is configured to receive policy rules from the policy application server 122a. In some embodiments, the policy decision engine 120a is physically deployed in the gateway 110. In other embodiments, the policy decision engine 120a is physically deployed in a different network element than the gateway 110.

The policy application server 122a is configured to manage policies and to assemble policy rules. Managing of policies includes the initial creation of policies, revision of policies, routing of policies throughout the network 100, and storing policies. The policy application server 122a is the authoritative source for policies throughout the mobile data network 100. The policy application server 122a is logically linked to the policy decision engine 120a. In some embodiments, the policy application server 122a is physically deployed in the gateway 110. In other embodiments, the policy application server 122a is physically deployed in a different network element. In some embodiments, the policy application server 122a is physically deployed with the policy decision engine 120a in the same network element. In other embodiments, the policy application server 122a is deployed separately from the policy decision engine 120a in a different network element. The policy application server 122a is discussed in more detail herein. The network 100 is not limited by the physical location of the policy decision engine 120a and the policy application server 122a.

The policy repository 124a is configured to store policies and to send policies to the policy application server 122a when needed. The policy repository 124a is logically linked to the policy application server 122. In some embodiments, the policy repository 124a is physically deployed with the policy application server 122a in the same network element. In other embodiments, the policy application server 122a is physically deployed separately from the policy application server 122a in a different network element. Policies may be stored in the policy application server 122a and the policy application server may have an integral database component for this function. However, storing policies in a logical separate element from the policy application server such as the policy repository 124a allows the network 100 to separately manage the policy repository 124a and the policy application server 122a. A logically separate policy repository 124a allows network elements other than the policy application server 122a to access the data in the policy repository 124a without going through the policy applications server 122a. Other network elements that may need access to the data in the policy repository 124a may include legacy control and charging systems, wireline systems owned by the same and operated by the same network operator.

The network database 125a is configured to store information about subscribers and services. Subscriber information may include services that the subscriber is authorized to use, preferences and options for a service that the subscriber has selected that can alter the way a service is delivered. Service information may include type, quantity and quality of network resources that a service requires. The network database 125a is logically linked to the policy application server 122a. Some of the subscriber and service information stored in the network database 125a may be selected as context data to be used in the policy application server 122a in making policy rules.

The provisioning portal 126a is configured to provide instructions to the policy application server 122a for the creation, managing and manipulating of policies. The provisioning portal 126a allows provisioning entities, such as network employees to send policy management information to the policy application server 122a. Policy management information can include instructions and algorithms on how to create or revise policies. Policy management information can include tables that inform the policy application server 122a in which of multiple databases (e.g., the databases 125a, 125b of FIG. 2) to look for context data. For example, a table may have a list of subscriber identifiers and for each subscriber identifier, indicate where a subscriber's preferences for a certain service are located. Another table may indicate where the subscriber's credit information is located. The provisioning portal 126a is logically connected with the policy application server 122.

The exemplary mobile data network 100 represented in FIG. 1 is a simple embodiment of a mobile data network with a policy and charging control architecture that includes the policy application server 122a. For the sake of clarity in understanding the operation of the policy application server 122a, FIG. 1 shows only a single gateway 110, policy decision engine 120a, and policy repository 124a. However, those skilled in the art will appreciate that typical networks will include multiple gateways 110, policy decision engines 120, policy repositories 124, network databases 125, and provisioning portals 126. The present architecture of the network 100 in FIG. 1 utilizes a single policy application server 122a for the entire network. This approach assures uniformity in the application of rules, provides for simplified revision of rules, and the introduction of new rules throughout the network 100.

A single logical policy application server 122a may be physically distributed in multiple network elements throughout the mobile data network 100 and communicate with the multiple gateways 110, policy decision engines 120 and policy repositories 124 in the manner described above with respect to FIG. 1.

Figure 2:
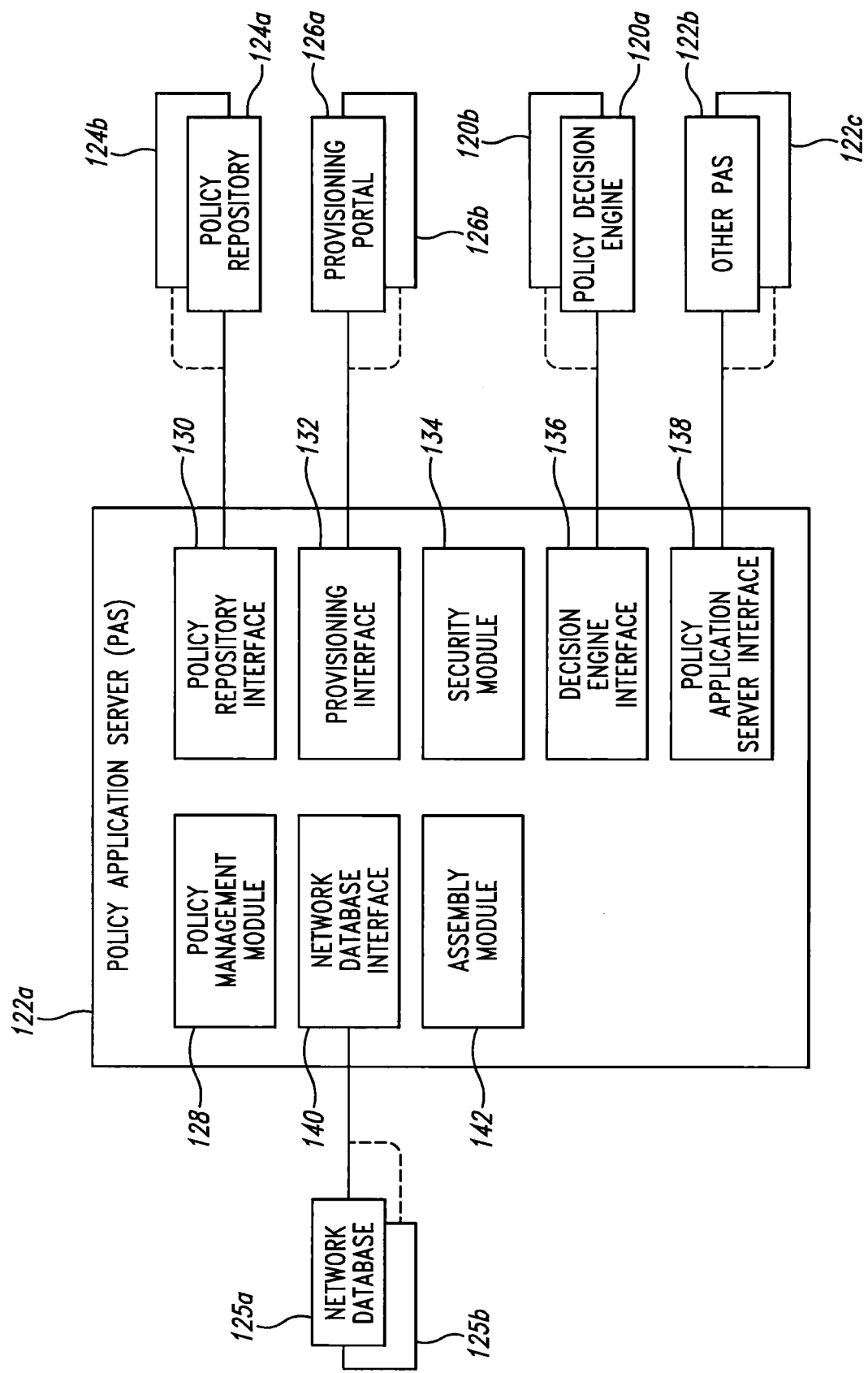
FIG. 2 shows a detailed view of a policy application server.

FIG. 2 shows a detailed view of the policy application server 122a. The policy application server 122a is a specialized application server that comprises a policy management module 128, a policy repository interface 130, a provisioning portal interface 132, a security module 134, a decision engine interface 136, a policy application server interface 138, a network database interface 140 and an assembly module 142. The components of the policy application server 122a listed above are logical components. Physically, these components may be in the same hardware element or they may be dispersed amongst several hardware elements that are communicatively connected to allow the components of the policy application server 122a to communicate with each other as described below.

The policy management module 128 is configured to manage policies. Managing of policy rules includes creating policies, revising policies, provisioning policies, setting precedents within groups of policies, and resolving conflicts of policies. Policy provisioning includes syntax checking, parsing and cataloging of policy rules. Resolving conflicts includes performing checks for conflicts between policies and then resolving these conflicts. Policy conflicts can occur when a provisioning entity, such as a network employee, enters a new policy that is different than an existing policy for the same purpose. Policy conflicts may also occur when different provisioning entities enter policies that are in conflict with each other.

The policy management module 128 is configured to find and retrieve policies. In some embodiments, all stored policies are stored in a single policy repository 124a. In other embodiments, some stored policies are stored in one policy repository 124a and other policies are stored in other policy repositories 124b. In some embodiments, the policy management module 128 is configured to maintain lists of policies and in which policy repository 124 each policies is stored. In other embodiments, the policy management module 128 is configured to query multiple policy repositories 124 to find needed policies. In yet other embodiments, the policy management module 128 is configured to find needed policies by both maintaining lists and querying.

The policy repository interface 130 is configured to send policies to and receive policies from one or more policy repositories 124. The policy repository interface 130 is configured to logically connect with multiple policy repositories (e.g., the policy repositories 124a and 124b of FIG. 2). In some embodiments, the policy repository interface 130 is configured to logically connect with only a single policy repository (e.g., the policy repository 124a in FIG. 1). In some embodiments, the policy repository interface 130 conforms with the DIAMETER specification (IETF RFC 3588). In some embodiments, the policy repository interface 130 conforms with the 3GPP specification for the Sp interface. The policy repository interface 130 is not limited to particular signaling protocol.

The provisioning interface 132 is configured to receive policy management information from provisioning portals 126. As described above regarding the provisioning portal 126a, policy management information can include instructions on creating or revising policies, and tables of where to look for context data. The provisioning interface 132 allows provisioning entities such as network employees to send policy management information to the policy application server 122a. The policy management information is passed on to the policy management module 128 for execution. The provisioning interface 132 is configured to logically connect to multiple provisioning portals 126 simultaneously. In some embodiments, the provisioning interface 132 conforms with the DIAMETER specification. The provisioning interface 132 is not limited to particular signaling protocol.

The security module 134 is configured to control access to the policy application server 122a and to control policy provisioning. Access to the policy application server 122a and policy control itself is controlled by security policy rules established by the network operator. For example, in order for a provisioning entity, such as a network employee, to access the policy application server, the security module 134 would check credentials presented by the provisioning entity by applying a policy decision to the credentials. The security module 134 would check instructions the provisioning entity sends to the policy application server 122a to determine if one of the security policy rules allows the provisioning entity to issue a particular instruction. In the example of FIG. 2, the security module 134 is logically linked with the provisioning interface 132.

The decision engine interface 136 is configured to connect with one or more policy decision engines 120. The policy decision engine interface 136 supplies policy rules to policy decision engines. The decision engine interface 136 is configured to logically connect to multiple policy decision engines 120 (e.g., the policy decision engines 120a and 102b of FIG. 2) simultaneously. In some embodiments, the decision engine interface 136 conforms with the DIAMETER (ITEF RFC3588) specification. In some embodiments, the decision engine interface 136 conforms with the 3GPP specification for the Gx interface (Diameter based). The decision engine interface 136 is not limited to a particular signaling protocol.

The policy application server interface 138 is configured to connect the policy application server 122a with other policy application servers (e.g. policy application servers 122b and 122c of FIG. 2). The policy application server interface 138 is configured to send and receive policies to and from the other policy application servers (e.g. policy application servers 122b and 122c). Typically, there will be only one policy application server 122a in a network. However, other networks, operated by other business entities may have other policy application servers (e.g. policy application servers 122b and 122c). A subscriber may roam into territory where there is no coverage by their subscribed network 100, but may have roaming privileges on another network that does cover that territory. If the subscriber then requests services while roaming, the visited network will need policies in order to control and charge for the service. In this situation, the home network policy application server 122a can send appropriate policies and context data to a policy application server in the roaming network (e.g. policy application server 122b), which can then route them to the appropriate policy decision engine in the visited network. The policy application server interface 138 is configured to logically connect to multiple policy application servers (e.g. policy application servers 122b and 122c) simultaneously. In some embodiments, the policy application server interface 138 conforms with the DIAMETER specification. The policy application server interface 138 is not limited to a particular signaling protocol. In some embodiments, the policy application server 122a and the other policy application servers 122b and 122c are arranged in a hierarchical or layered policy management system. In some embodiments, the policy application server 122a is configured to manage policies within a convergent framework, managing wireless and wireline networks.

The network database interface 140 is configured to send data to and receive data from one or more network databases 125. As described above, the network database 125a is configured to store information about subscribers and services. Subscriber information may include subscriber identification data, services for which the subscriber is authorized, preferences and options for a service that the subscriber has selected that can alter the way a service is delivered. Service information may include type, quantity and quality of network resources that a service requires. Some of the information in the network database 125a may be used as context data to make policy rules. The network database interface 140 provides the means for the policy application server 122a to obtain context data. The network database interface 140 is configured to connect a single network database (e.g., the database 125a in FIG. 1) to multiple network databases (e.g., the network databases 125a and 125b of FIG. 2) simultaneously. In some embodiments, the network database interface 140 conforms with the DIAMETER specification. In some embodiments, the network database interface 140 conforms with the 3GPP specification for the Sp interface. In some embodiments, the network database interface 140 conforms with the 3GPP specification for the Rx interface. The network database interface 140 is not limited to a particular protocol.

The assembly module 142 is configured to assemble policy rules from policies and formatted context data. Context data needed to make a policy rule may be scattered in several different network databases 125. The context data from different databases may be stored in different formats and may require re-formatting in order to be used in making the policy rule. The assembly module 142 is configured to assemble formatted context data, which includes finding, retrieving and formatting context data for a particular policy. The assembly module 142 is configured to use the policy and the formatted context data to make a policy rule.

In some embodiments, the assembly module 142 is configured to find and retrieve formatted context data. Context data is particular to a subscriber and service. In some situations it may be more efficient to store the context data or the policy rule rather than recreate it each time it is needed. In some embodiments, all formatted context data and policy rules stored are stored in one policy repository 124a. In other embodiments, some stored policy rules and formatted context data may be stored in one policy repository 124a and other stored policy rules and formatted context data may be stored in another policy repository (e.g., policy repository 124b). The assembly module 142 is configured to maintain lists of policy rules and formatted context data and in which policy repository 124 each policy rules and set of formatted context data is stored. In other embodiments, the assembly module 142 is configured to query one or more policy repositories (e.g., policy repositories 124d and 124b) to find needed policy rules or formatted context data. In yet other embodiments, the assembly module 142 is configured to find needed policy rules or formatted context data by both maintaining lists and querying.

As an example of the operation of the assembly module 142, a service identifier for a SIP call service may be stored in a service offering database and a particular user's preferences regarding that SIP call service may be stored in a user profile database. The user's preference may be that an SIP call be routed to his work phone during working hours and be routed to his home phone after working hours. When a policy decision is required for that particular SIP call service and that particular user, the assembly module 142 assembles a policy rule. The assembly module finds the appropriate SIP call routing policy and then searches for relevant formatted context data. The assembly module 142 may then retrieve the user's preference information for SIP call routing from the network database 125a storing that preference information. The assembly module 142 then formats the user preference information to fit the policy governing routing of SIP calls. The assembly module 142 then uses the SIP call routing policy and the formatted user preference information to make a policy rule for governing the routing of SIP calls for this particular subscriber. The policy rule is then sent, via the decision interface 136, to one of the policy decision engines (e.g., policy decision engine 120a), which uses this policy rule to make a policy decision FIG. 3 illustrates a call flow diagram of the policy application server 122a assembling formatted context data. In some embodiments, the assembly module 142 in the policy application server 122a may assemble formatted context data in response to a request from the policy decision engine 120a for a policy rule. In other embodiments, the policy application server 122a may assemble formatted context data in response to a request from the application server 114 to generate policy rules to support a particular service the application server 114 is to provide to a particular user's equipment 112.

In step 150, the policy application server 122a sends a request for a particular policy to the policy repository 124. The policy repository 124a may be one of several policy repositories 124 to which the policy application server 122a is logically connected. The policy application server 122a may determine which policy repository 124 has the particular policy by consulting an internal look-up table or by querying multiple policy repositories 124.

In step 152, the policy repository 124a sends the policy to the policy application server 122.

In step 154, the policy application server 122a sends a request for context data to the network database 125. The policy application server 122a must first determine what context data is needed to make the desired policy rule. Depending on the particular policy, the context data may be scattered among several network databases 125, requiring the policy application server 122a to request context data from each.

In step 156, the network database 125a sends context data to the policy application server 122a. If the context data needed was scattered among several network databases 125, then each of the several network databases 125 sends its respective part of the context data to the policy application server 122a.

In step 158, the policy application server 122a generates a policy rule using the policy and the context data. The policy application server 122a first formats the context data into a format that is compatible with the policy.

In step 160, the policy application server 122a sends the policy rule to the policy decision engine 120a.

In step 162, the policy application server 122a sends the policy rule or formatted context data to the policy repository 124a for storage, if the policy application server 122a determines that it is efficient to do so. Various criteria may be used to determine the efficiency of storing the formatted context data or policy rule versus repeatedly reassembling the policy rule. In some embodiments the criteria is based on how many network databases 125 had to be contacted to assemble all the context data. In other embodiments, the difficultly of reaching the requested network database 125a may be considered. In some embodiments, the frequency with which the policy application server 122a has been requested to assemble the particular formatted context data is considered. Those skilled in the art will appreciate that other decision criteria can be applied to determine whether the formatted context data should be stored in the policy repository.

Some or all of the components described herein may in some embodiments be implemented as a computer processor coupled to a memory, the memory containing instructions that when executed by the computer processor, perform the functions as described above. Some or all of the components may be implemented as hard-wired circuits.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

What is claimed is:

1. A policy application server in a communication network comprising:

a policy management module for managing policies, wherein the policy management module for managing policies performs at least one of: provisioning the policies, resolving conflicts of the policies, and setting precedents within groups of the policies;

a policy repository interface communicatively coupled to the policy management module and for transferring the policies between the policy management module and a policy repository;

an assembly module for generating a policy rule based on the policies received from the policy management module and context data, in response to a request for the policy rule when a mobile data packet in a gateway sent over an access network bearer of a mobile data network is examined, wherein the context data comprises information related to a specific service session for a specific subscriber; and a decision engine interface for sending the policy rule to one of a plurality of policy decision engines, wherein the policy rule is applied to the mobile data packet related to a service data flow carrying the specific service session for the specific subscriber in the communication network.

2. The policy application server of claim 1, further comprising a policy application server interface for transferring the policies between a plurality of other policy applications servers and the policy management module.

3. The policy application server of claim 1 wherein the policy management module further performs at least one of: create the policies, and change the policies.

4. The policy application server of claim 1 wherein the policy repository interface is for receiving policy management data by receiving instructions to manage the policies.

5. The policy application server of claim 1, wherein the policy management module is for provisioning the policies by checking for conflicts between the policies and for resolving the conflicts.

6. The policy application server of claim 1 further comprising a provisioning interface for receiving policy management data from provisioning portals, and to pass the policy management data to the policy management module.

7. The policy application server of claim 6 wherein the policy repository interface is for transferring policy rules between the assembly module and the policy repository.

8. The policy application server of claim 6 wherein the policy repository interface is for transferring policy rules between the assembly module and selected ones of a plurality of policy repositories.

9. The policy application server of claim 1, wherein the assembly module is for assembling policy rules to retrieve the context data, wherein the context data is data needed to make a particular policy rule from a particular policy; and wherein the assembly module is for assembling the policy rules to format context data into a format used for making the policy rules in the system.

10. The policy application server of claim 9 wherein the context data includes subscriber data.

11. The policy application server of claim 9 wherein the context data includes service data.

12. A policy application server in a policy-based control and charging system comprising:

a hardware processor; and a computer-readable medium storing a plurality of instructions which, when executed by the hardware processor, cause the hardware processor to perform operations, the operations comprising:

receiving policies and generating policy rules based upon the policies and context data, wherein the context data comprises information related to a specific service for a specific subscriber, wherein the generating generates one of the policy rules in response to a request for the one of the policy rules when a mobile data packet in a gateway sent over an access network bearer of a mobile data network is examined, wherein the policies are received from a policy management module for managing policies, wherein the policy management module for managing policies performs at least one of: provisioning the policies, resolving conflicts of the policies, and setting precedents within groups of the policies;

transferring the policy rules between the policy application server and multiple policy repositories; and sending the policy rules to one of a plurality of decision engines, wherein the one of the policy rules is applied to the mobile data packet related to a service data flow carrying the specific service session for the specific subscriber in a communication network.

13. The policy application server of claim 12 further comprising assembling the policy rules by retrieving and formatting the context data, wherein the context data is data needed to make the one of the policy rules.

14. The policy application server of claim 13 wherein the context data includes subscriber data.

15. The policy application server of claim 13 wherein the context data includes service data.

16. The policy application server of claim 12 further comprising transferring the policy rules and formatted context data between the policy application server and other policy applications servers.

17. A method for a policy application server to provide formatted context data comprising:

requesting, via the policy application server, a policy when a mobile data packet in a gateway sent over an access network bearer of a mobile data network is examined;

receiving the policy from a policy management module for managing policies, wherein the policy management module for managing policies performs at least one of: provisioning the policies, resolving conflicts of the policies, and setting precedents within groups of the policies;

requesting context data, wherein the context data is data that is used with the policy to make a policy rule and comprises information related to a specific service session for a specific subscriber;

receiving the context data;

generating the policy rule based upon the policy and the context data; and sending the policy rule to a decision engine, wherein the policy rule is applied to the mobile data packet related to a service data flow carrying the specific service session for the specific subscriber in a communication network.

18. The method of claim 17 wherein the context data includes service data.

19. The method of claim 17 wherein the context data includes subscriber data.

20. The method of claim 17 wherein the requesting the context data includes selecting a plurality of network databases from which to request the context data.

21. The method of claim 17 further comprising storing the policy rule in one of a plurality of policy repositories.

22. A policy management method in a communication network, comprising:

in response to receiving a user request from a specific subscriber for a service from the communication network, requesting context data in a policy application server, wherein the context data is data related to the service and the specific subscriber;

receiving the context data from a context data source in response to the user request;

formatting the context data into a format used for making policy rules;

requesting a policy related to the service from a policy source;

receiving the policy in response to the requesting, wherein the policy is received from the policy source for managing policies, wherein the policy source for managing policies performs at least one of: provisioning the policies, resolving conflicts of the policies, and setting precedents within groups of the policies;

generating a policy rule in the policy application server using the context data that is formatted and the policy in response to the user request; and sending the policy rule to a policy decision engine, wherein the policy rule is applied to a mobile data packet in a gateway sent over an access network bearer of a mobile data network, wherein the mobile data packet is related to a service data flow carrying a service session for the specific subscriber in the communication network.

23. The method of claim 22 wherein the context data is stored in a plurality of context data sources and the policy application server requests the context data from the plurality of context data sources.

24. The method of claim 22 wherein the communication network comprises a plurality of policy decision engines and the policy application server sends the policy rule to one of the plurality of policy decision engine.

25. The method of claim 22, further comprising storing the context data that is formatted in a policy repository.

26. The method of claim 22, further comprising storing the policy rule in a policy repository.

* * * * *